United States Patent
Maki et al.

(10) Patent No.: US 9,049,741 B2
(45) Date of Patent: *Jun. 2, 2015

(54) MOBILE WLAN GATEWAY

(75) Inventors: Lasse Maki, Helsinki (FI); Tom Ojala, Espoo (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 405 days.

This patent is subject to a terminal disclaimer.

(21) Appl. No.: 13/489,350

(22) Filed: Jun. 5, 2012

(65) Prior Publication Data

US 2012/0257610 A1 Oct. 11, 2012

Related U.S. Application Data

(63) Continuation-in-part of application No. 13/240,419, filed on Sep. 22, 2011, now Pat. No. 8,625,461, which is a continuation of application No. 12/264,726, filed on Nov. 4, 2008, now Pat. No. 8,064,417.

(30) Foreign Application Priority Data

Jan. 16, 2008 (FI) ...................................... 20080032

(51) Int. Cl.
*H04W 4/00* (2009.01)
*H04W 88/04* (2009.01)
(Continued)

(52) U.S. Cl.
CPC ............... *H04W 88/04* (2013.01); *H04M 15/58* (2013.01); *H04L 61/1511* (2013.01);
(Continued)

(58) Field of Classification Search
CPC ... H04W 88/04; H04M 15/58; H04L 61/1511
USPC ........................................................ 370/338
See application file for complete search history.

(56) References Cited

U.S. PATENT DOCUMENTS 7,408,910 B2 8/2008 Kimata et al.
7,441,043 B1 10/2008 Henry et al.
(Continued)

FOREIGN PATENT DOCUMENTS

CN 1627842 A 6/2005
CN 1732640 A 2/2006
(Continued)

OTHER PUBLICATIONS $2^{nd}$ Office Action in corresponding Australian Patent Application No. 2008347702 (Nov. 14, 2012).
(Continued)

*Primary Examiner* — Asad Nawaz
*Assistant Examiner* — Syed S Ali
(74) *Attorney, Agent, or Firm* — Leydig, Voit & Mayer, Ltd.

(57) ABSTRACT

A technique for operating a mobile station as wireless local-area network ["WLAN"] gateway. A gateway application sets up (3-0) a WLAN base station capable of communicating with WLAN terminals over a WLAN network; creates a network identifier (3-2, 3-4) for the WLAN base station; assigns (3-8, 3-10) an IP address for the WLAN terminals; resolves domain name service ["DNS"] queries (3-12 . . . 3-18) in cooperation with an external DNS service system; assigns a port number protocols supported by the gateway application; and tunnels internet traffic (3-30 . . . 3-36) between the WLAN terminals and an internet host over the broadband connection. The memory further comprises a media server application for sharing content among the one or more WLAN terminals. The gateway application may redirect (6-22) a first HTTP page request (6-24) from the WLAN terminals to a start page of the media server application.

10 Claims, 5 Drawing Sheets

(51) Int. Cl.
| | |
|---|---|
| *H04M 15/00* | (2006.01) |
| *H04L 29/12* | (2006.01) |
| *H04W 8/26* | (2009.01) |
| *H04W 76/02* | (2009.01) |
| *H04W 76/04* | (2009.01) |
| *H04W 84/12* | (2009.01) |
| *H04W 88/06* | (2009.01) |
| *H04W 88/08* | (2009.01) |
| *H04W 88/16* | (2009.01) |
| *H04W 92/02* | (2009.01) |
| *H04W 12/06* | (2009.01) |

(52) U.S. Cl.
CPC ............. *H04L 61/2038* (2013.01); *H04W 8/26* (2013.01); *H04W 76/02* (2013.01); *H04W 76/04* (2013.01); *H04W 84/12* (2013.01); *H04W 88/06* (2013.01); *H04W 88/08* (2013.01); *H04W 88/16* (2013.01); *H04W 92/02* (2013.01); *H04W 12/06* (2013.01); *H04M 2215/0192* (2013.01); *H04M 2215/20* (2013.01); *H04M 2215/2033* (2013.01)

(56) References Cited

U.S. PATENT DOCUMENTS

| | | | |
|---|---|---|---|
| 7,450,554 B2 | 11/2008 | Zhang | |
| 7,577,142 B2 | 8/2009 | Kloth | |
| 7,650,148 B2 | 1/2010 | Kim et al. | |
| 7,743,094 B2 | 6/2010 | Metke et al. | |
| 7,801,100 B2 | 9/2010 | Agardh et al. | |
| 7,831,236 B2 | 11/2010 | Robertson et al. | |
| 7,849,177 B2 | 12/2010 | Uhlik | |
| 7,916,663 B2 | 3/2011 | Yee | |
| 7,944,867 B2 | 5/2011 | Usuba | |
| 8,032,174 B2 | 10/2011 | Kezys et al. | |
| 8,036,191 B2 | 10/2011 | Kroselberg et al. | |
| 8,050,192 B2 | 11/2011 | Park | |
| 8,064,402 B2 | 11/2011 | Jun et al. | |
| 8,064,417 B2 | 11/2011 | Maki | |
| 8,064,418 B2 | 11/2011 | Maki | |
| 8,073,446 B2 | 12/2011 | Ishii et al. | |
| 2002/0069278 A1 | 6/2002 | Forslow | |
| 2003/0035397 A1 | 2/2003 | Haller et al. | |
| 2003/0165128 A1 | 9/2003 | Sisodia et al. | |
| 2004/0077374 A1 | 4/2004 | Terry | |
| 2004/0125762 A1 | 7/2004 | Haller et al. | |
| 2004/0203836 A1 | 10/2004 | Gorday et al. | |
| 2004/0221046 A1 | 11/2004 | Heinonen et al. | |
| 2005/0036468 A1 | 2/2005 | Miyabayashi et al. | |
| 2005/0043035 A1 | 2/2005 | Diesen et al. | |
| 2005/0286476 A1 | 12/2005 | Crosswy et al. | |
| 2006/0040656 A1* | 2/2006 | Kotzin | 455/426.2 |
| 2006/0068799 A1 | 3/2006 | Morton et al. | |
| 2006/0123470 A1 | 6/2006 | Chen | |
| 2006/0126565 A1 | 6/2006 | Shaheen | |
| 2006/0126584 A1 | 6/2006 | Zhang et al. | |
| 2007/0002833 A1 | 1/2007 | Bajic | |
| 2007/0008937 A1 | 1/2007 | Mody et al. | |
| 2007/0037547 A1* | 2/2007 | Cheol | 455/343.1 |
| 2007/0160023 A1 | 7/2007 | Wittmann | |
| 2007/0211714 A1 | 9/2007 | Metke et al. | |
| 2008/0014934 A1 | 1/2008 | Balasubramanian et al. | |
| 2008/0069037 A1* | 3/2008 | Zhang et al. | 370/328 |
| 2008/0267152 A1 | 10/2008 | Alnas et al. | |
| 2008/0305792 A1* | 12/2008 | Khetawat et al. | 455/435.1 |
| 2009/0040954 A1 | 2/2009 | Usuba | |
| 2009/0067395 A1 | 3/2009 | Curtis et al. | |
| 2009/0067398 A1* | 3/2009 | Green et al. | 370/338 |
| 2009/0290561 A1 | 11/2009 | Kleindl | |
| 2010/0099455 A1* | 4/2010 | Bari et al. | 455/553.1 |
| 2011/0177805 A1 | 7/2011 | Maki | |
| 2011/0212725 A1* | 9/2011 | Vikberg et al. | 455/435.2 |
| 2012/0008612 A1 | 1/2012 | Maki | |
| 2012/0010521 A1 | 1/2012 | Maki | |
| 2012/0257610 A1 | 10/2012 | Maki | |

FOREIGN PATENT DOCUMENTS

| | | |
|---|---|---|
| CN | 1954554 A | 4/2007 |
| DE | 10 2005 051291 | 5/2007 |
| EP | 1 914 954 | 4/2008 |
| GB | 2 369 003 | 9/2004 |
| GB | 2 407 003 | 4/2005 |
| JP | 2005-189154 | 7/2005 |
| JP | 2005348397 A | 12/2005 |
| JP | 2006005824 A | 1/2006 |
| JP | 2008041086 A | 2/2008 |
| KR | 20060019707 | 3/2006 |
| KR | 10-0638439 | 10/2006 |
| WO | WO 2004/075583 | 9/2004 |
| WO | WO 2005/011183 | 10/2005 |
| WO | WO 2009/135986 | 11/2005 |
| WO | WO 2006/088135 | 8/2006 |
| WO | WO 2006/094256 | 9/2006 |
| WO | WO 2009/090295 | 7/2009 |

OTHER PUBLICATIONS

Search Report in corresponding Chinese Patent Application No. 200880124512.1 (Sep. 21, 2012).
1st Office Action in corresponding U.S. Appl. No. 13/240,419 (Jan. 1, 2013).
Notice of Allowance in related U.S. Appl. No. 13/240,419 (Sep. 18, 2013).
International Search Report in corresponding PCT Patent Application No. PCT/FI2009/050770 (Mar. 9, 2010).
"MDA Pro User Manual," Aug. 10, 2005, pp. 1-204, XP55040238, retrieved from http://www.skytel.co.cr/microsoft/research/acrobat/050810.pdf.
European patent application No. 08870831.8-1249, European Communication completed Oct. 15, 2012.
U.S. Appl. No. 13/240,468, Office Action mailed Oct. 2, 2012.
GlobeSurfer II, Brochure, www.option.com/products/globesurfer>II.shtml, (2007).
Wei et al., "WWAN/WLAN Two-Hop-Relay Architecture for Capacity Enhancement," IEEE Communications Society, Wireless Communications and Networking Conference, WCNC, pp. 225-230, (2004).
PCT Search Report, National Board of Patent and Registration of Finland, PCT/FI2009/050770, May 26, 2010.
PCT Search Report, National Board of Patent and Registration of Finland, PCT/FI2008/050717, Apr. 7, 2009.
PCT Search Report, National Board of Patent and Registration of Finland, PCT/FI2008/050617, Jan. 21, 2009.
European patent application No. 09841657.1-1249, European Search Report mailed Jun. 13, 2012.
European patent application No. 08870831.8-1249, European Search Report completed Jun. 13, 2012.
Japanese patent application No. 2010-542654, Notification of Reasons for Rejection issued Nov. 25, 2011.
U.S. Appl. No. 12/264,726, Office Action mailed Mar. 30, 2011.
U.S. Appl. No. 12/336,279, Office Action mailed May 25, 2011.
U.S. Appl. No. 12/933,855, Office Action mailed Jun. 12, 2012.
1st Office Action in corresponding Japanese Patent Application No. 2012-014356 (Jul. 2, 2013).
1st Office Action in corresponding U.S. Appl. No. 13/711,602 (Mar. 27, 2013).
Notice of Allowance issued in corresponding U.S. Appl. No. 12/264,726 (Sep. 1, 2011).
Notice of Allowance in corresponding U.S. Appl. No. 13/711,602 (Jun. 25, 2013).

* cited by examiner

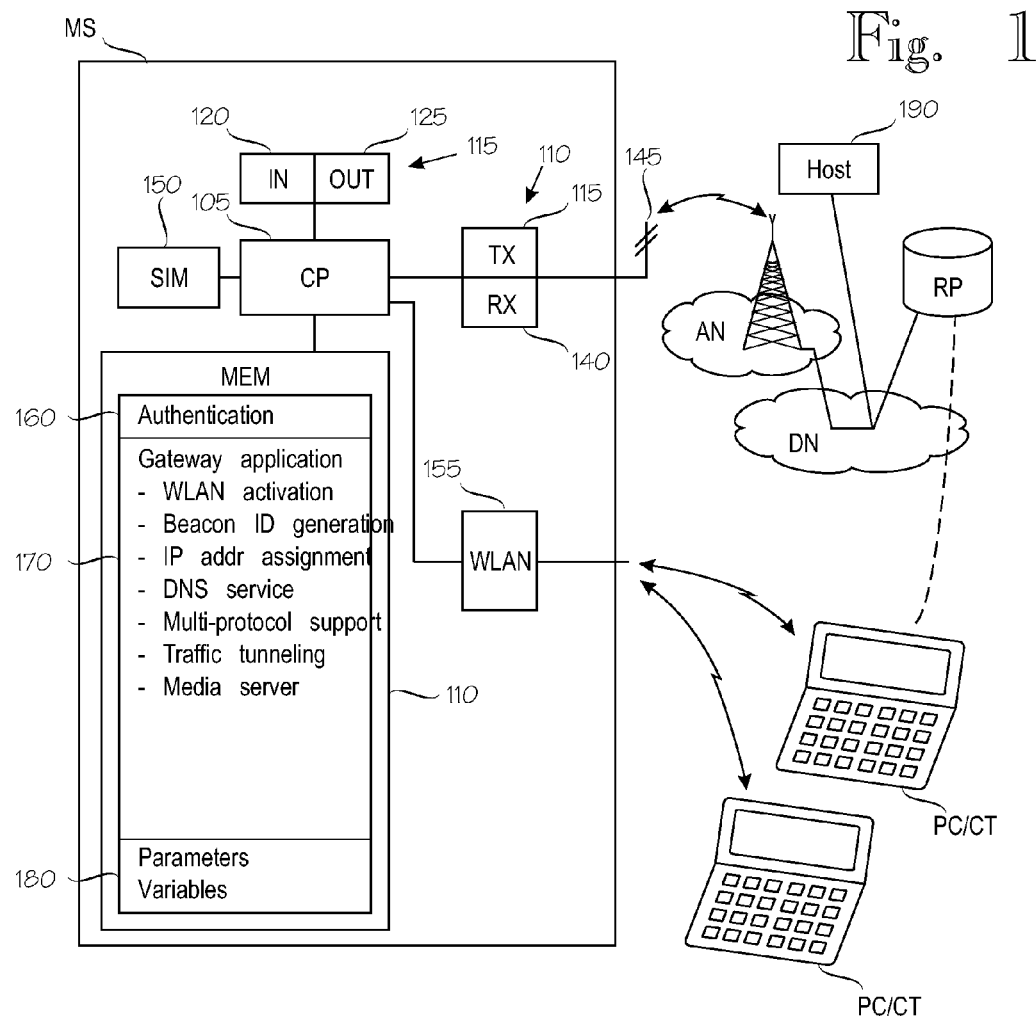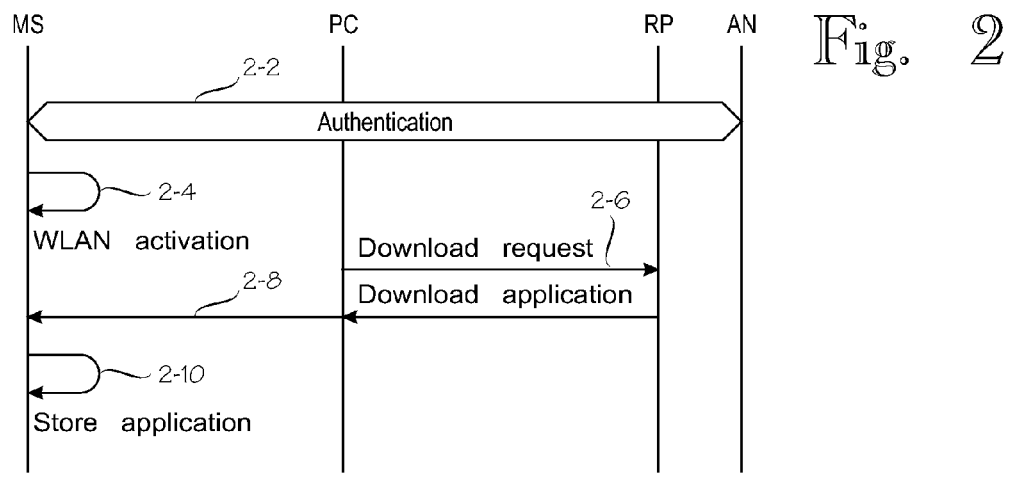

MOBILE WLAN GATEWAY

CROSS REFERENCE TO RELATED APPLICATIONS

The present application is a continuation-in part application and claims the priority benefit of U.S. patent application Ser. No. 13/240,419, filed 22 Sep. 2011, which is a continuation of U.S. patent application Ser. No. 12/264,726, filed 4 Nov. 2008, which in turn claims priority from Finnish patent application 20080032, filed 16 Jan. 2008. Each of the applications and herein incorporated by reference in their entirety.

BACKGROUND

1. Field of the invention

The invention relates to methods, apparatuses and software products for providing a wireless broadband internet connection via a mobile communication network. In the context of the present invention, a broadband connection means a connection capable of transmitting traffic, in good network conditions, faster than a V.90 modem can, or faster than 64 kilobits per second.

2. Background of the Invention

Wireless broadband modems can be used to couple personal computers or client terminals to the internet in places where wired internet connections or local-area networks are not available. Prior art wireless broadband modems exhibit certain problems. For instance, sharing a single wireless broadband connection among several users (client terminals) is awkward at best. Normally this requires setting up one of several client terminals as a master terminal that provides the internet connection to the remaining client terminals. This process consumes resources of the master terminal and the client terminals cannot operate without the master. The difficulty of sharing a single wireless broadband connection among several users is understandable in view of the fact that most wireless broadband modems are given or sold at a nominal cost by mobile network operators in connection with a network subscription. The network operators' obvious desire is to sell a subscription to each user instead of sharing a single connection among several users.

Another problem of prior art wireless broadband modems is the fact that most of them are "wireless" only towards the mobile network and the connection to the client terminal takes place via a USB cable. The wired connection is actually a benefit in connection with fixed client terminals, such as home computers, because the wired connection can also supply power to the wireless broadband modem, but in connection with mobile client terminals, the wired nature of the USB connection is a definite handicap. A still further problem is that it is difficult to share content among the several users or client terminals.

SUMMARY

An object of the present invention is to develop a method, an apparatus and software products so as to alleviate one or more of the problems identified above. The object is achieved by methods, apparatuses and software products as defined in the attached independent claims. The dependent claims and the drawings with their associated descriptions relate to specific embodiments.

An aspect of the invention is a method for operating mobile station as wireless local-area network ("WLAN") gateway. The mobile station comprises a memory for storing applications and data; a processor for executing the stored applications; a user interface comprising an input section and an output section; reception/transmission circuitry for providing a communication interface to one or more access networks; authentication means operable to authenticate a user of the mobile station; a radio transceiver operable to establish and maintain a broadband connection with a mobile communication network in response to a successful authentication of the user of the mobile station; and wireless WLAN means responsive to an activation or deactivation command according to a setting received via the input section of the user interface. The inventive method comprises instructing the processor by a gateway application to control the following operations:

activating the WLAN means as a WLAN base station capable of communicating with at least one WLAN terminal over a WLAN network;

creating a network identifier for the WLAN base station;

assigning an internet protocol address for the at least one WLAN terminal;

resolving domain name service ("DNS") queries in cooperation with an external DNS service system;

assigning at least one port number for each protocol supported by the gateway application; and tunneling internet traffic between the at least one WLAN terminal and an internet host over the broadband connection.

Another aspect of the invention is gateway application implemented as a software product which comprises a code portion for instructing the mobile station's processor to control the mobile station to perform each of the six above-defined operations. Yet another aspect of the invention is a mobile station which comprises the inventive gateway application, either as a factory-installed application or as a downloadable application.

In one specific embodiment the mobile station further comprises means for receiving, installing and executing downloadable programs and the inventive gateway application is a downloadable application. Implementing the inventive gateway application as a downloadable application provides the added benefit that the inventive technique is applicable to mobile stations which are physically capable of performing the inventive method but do not contain the necessary software.

In another specific embodiment the gateway application further comprises a code portion to redirect a first HTTP page request from each mobile station during an internet session to a predetermined internet address. Redirecting the mobile station's first HTTP page request during an internet session provides the owner of the predetermined internet address with the benefit that the mobile station user must begin an internet session via the predetermined internet address. That address may contain useful information or advertisements, for example.

Yet another specific embodiment is a gateway application for a mobile station, wherein the mobile station comprises a GPS receiver or other means for determining the mobile station's location, and the gateway application comprises a code portion for associating the determined location to the tunneled internet traffic. The gateway application and/or some internet-based supplementary server(s) may use the determined location to produce one or more additional or supplementary services to the WLAN terminal.

The gateway application may further comprise a code portion for collecting traffic statistics in respect of the tunneled traffic and for transmitting at least some of the collected traffic statistics to an advertising server and/or billing server, so as to use the traffic statistics for advertising and/or billing.

BRIEF DESCRIPTION OF THE DRAWINGS

In the following the invention will be described in greater detail by means of specific embodiments with reference to the attached drawings, in which:

FIG. 1 is a schematic block diagram of a representative mobile station.

FIG. 2 shows some preparatory acts, some of which may be optional.

DETAILED DESCRIPTION

Figure 3:
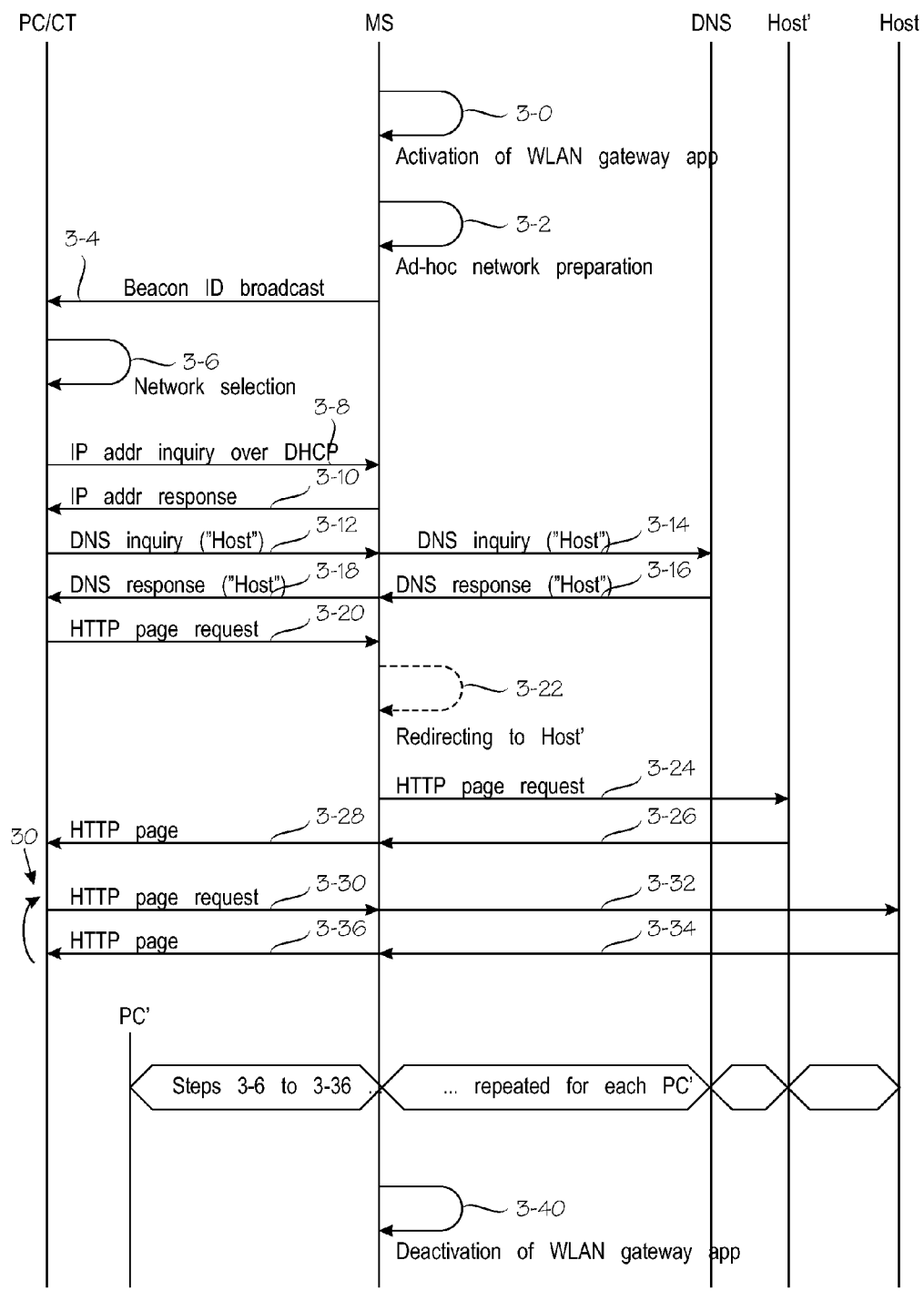
FIG. 3 shows an illustrative scenario involving a client terminal and a mobile station which supports a gateway application according to the present invention.

FIG. 1 is a schematic block diagram of a representative mobile station MS. The mobile station MS includes a central processing unit CP 105 and memory 110. In addition, the mobile station MS includes or utilizes external input-output circuitry 115 which constitutes the multimode terminal's user interface and includes an input circuitry 120 and an output circuitry 125. The input circuitry 120 includes the mobile station's microphone and user-input device, such as a keypad and/or touch screen. The output circuitry 125 includes the mobile station's display and earphone or loudspeaker. The mobile station MS further includes reception/transmission circuitry 130 which includes a transmission circuitry 135, reception circuitry 140 and antenna 145. A subscriber identity module, SIM, 150 is used by an authentication function 160 to authenticate the mobile station user and to identify the user's subscription to the access network. The mobile station also includes WLAN (Wireless Local Area Network) circuitry 155 whose normal mode of usage is acting as a WLAN client to a WLAN base station (not shown).

In order to support installable program modules, the mobile station's memory MEM 110 may include routines for downloading installable program modules and for storing the installable program modules in the memory MEM for execution by the central processing unit CP. FIG. 1 shows an arrangement in which the mobile station is configured to download installable program modules from a repository RP via a data network DN, an access network AN, the antenna 145 and reception circuitry 140, although other arrangements are equally possible, such as downloading the installable program modules via the data network DN to a personal computer PC, from which the installable program modules are transferred to the mobile station the WLAN circuitry 155 or via some other short-range connection, such as Bluetooth or Universal Serial Bus (USB, not shown separately). The reference sign PC/CT means that the personal computer PC serves as an example of a client terminal CT. The access network AN is typically a broadband-capable mobile communication network, while the data network DN is typically the internet or some closed subnetwork implementing internet protocol (IP), commonly called intranets or extranets. At this level of generalization, all previously-discussed elements of FIG. 1 can be conventional as used in the relevant art. One or more external hosts 190 are accessible via the access network AN and data network DN, as will be described in more detail below. Finally, reference numeral 180 denotes an area of the memory 110 used to store parameters and variables.

The foregoing description of FIG. 1 describes an applicable mobile station in technical terms. Such mobile stations are commercially available: For instance, at the priority date of the present invention, mobile stations based on Symbian S60 or S80 platforms can be used, provided that they support WLAN and broadband communications. A departure from prior art mobile stations can be seen in the fact that the mobile station includes the inventive gateway application 170, either as a factory-installed software application or as a downloadable application. The reference sign PC, which denotes the personal computer being used as the client terminal, is derived from "personal computer", but those skilled in the art will realize that the mobile station MS provided with the inventive gateway application 170 supports virtually any client terminal capable of acting as a WLAN client, such as laptop computers, smart telephones, personal digital assistants, home entertainment devices, digital cameras, etc., to name just a representative sample of applicable device types.

FIG. 2 shows some preparatory acts, some of which may not be necessary in all embodiments of the present invention. In step 2-2 the mobile station MS is authenticated. This step, which is well known to those skilled in the art, involves reception of a PIN code via the mobile station's user interface, and using the mobile stations SIM card in a registration process to the access network AN. In step 2-4 the mobile station's WLAN circuitry is activated according to a setting from the mobile station's user interface. In steps 2-6 through 2-8 the inventive gateway application is downloaded via a personal computer PC from the repository RP. In cases wherein the gateway application is downloaded without the personal computer, the download request and application download would take place directly between the mobile station MS and the repository RP. In step 2-10 the downloaded gateway application is stored in the mobile station's memory for later execution, as will be further described in connection with FIG. 3.

The WLAN activation step may not be necessary if the mobile station's WLAN circuitry is permanently enabled. The downloading and storing acts may be omitted in embodiments having the gateway application permanently stored or pre-installed in the mobile station's memory.

FIG. 3 depicts an illustrative scenario involving a client terminal (represented in FIG. 3 by a personal computer PC) and a mobile station which supports a gateway application according to the present invention. In step 3-0 the inventive gateway application is executed in the mobile station. The execution of the gateway application is typically started in response to a user instruction via the mobile station's user interface. In a typical implementation, the mobile station receives user interface navigation instructions to "Applications" from which the inventive gateway application is selected for execution. One of the acts performed by the mobile station's processor, under control of the inventive gateway application, is to ensure that the WLAN circuitry of the mobile station is operational. The significance of step 3-0, and of the corresponding deactivation step 3-40, is that the mobile station is only reserved for wireless broadband gateway applications for a user-specified time, and at other times the mobile station can perform whatever tasks required by its user.

In step 3-2 the gateway application instructs the mobile station's processor to prepare an ad-hoc WLAN network around the mobile station, by acting as a WLAN base station (as opposed to the mobile station's more conventional usage as a WLAN client). In step 3-4 the gateway application instructs the mobile station to initiate broadcasting of a beacon ID message, which typically is an IBSSID message as defined in standard IEEE 802.11x. Step 3-4 is depicted as an arrow, but in practice the broadcasting of the beacon ID message should be repeated until step 3-40 in which the execution of the gateway application is terminated.

In step 3-6 the client terminal PC searches for available WLAN networks and detects the broadcasted beacon ID and selects the WLAN network created by the mobile station MS. In step 3-8 the client terminal PC, as part of a conventional WLAN attach procedure, requests an IP address from the mobile station's WLAN base station, which returns the requested IP address in step 3-10. Dynamic Host Configuration Protocol (DHCP) is typically used for steps 3-8 and 3-10.

Let us assume that the client terminal PC tries to retrieve a web page from the internet host (item 190 in FIG. 1). In step 3-12 the client terminal PC sends a domain name service (DNS) query for the IP address of the host's web page to the DNS server of the mobile station's gateway application. In step 3-14 the mobile station's gateway application forwards the DNS query to internet's domain name service and obtains the host's IP address in step 3-16. In step 3-18 the mobile station's gateway application returns the host's IP address to the client terminal PC.

In step 3-20 the client terminal PC requests a web page from the host's IP address. Hypertext Transfer Protocol (HTTP) is typically used for this purpose. This request, like any communication between the client terminal PC and any internet hosts, takes place via the inventive gateway application being executed in the mobile station. Step 3-22 is an optional step which may be omitted in some embodiments. When performed, step 3-22 includes redirecting the first HTTP page request from client terminal PC to another internet host, called Host'. This means that in step 3-24 the gateway application forces the client terminal's first HTTP page request to a forced home page at the IP address of Host'. For example, the operator of the site Host' may display advertisements in exchange of sponsoring communication costs over the access network AN. In step 3-26 the web site Host' returns the requested web page, which the gateway application relays to the client terminal PC in step 3-28. Another application for the forced home page feature will be described in connection with FIG. 6.

In step 3-30 the client terminal PC again requests the web page from the host's IP address. Since this the second (or further) page request from the client terminal, the gateway application no longer redirects the HTTP request but relays it to the Host in step 3-32. In steps 3-34 and 3-36 the requested web page from the Host is transmitted to the client terminal. As shown by arrow 30, the process can return from step 3-36 to step 3-20 when future web pages are requested. The loops 3-30 through 3-36 can be repeated until the gateway application is terminated in step 3-40. If the forced home page feature (step 3-22) is not implemented, the first HTTP request (step 3-20) is processed similarly to the subsequent HTTP requests (step 3-30). In subsequent executions of step 3-30, if the HTTP page request relates to a web page for which the gateway application does not have an IP address, a DSN query will be performed (cf. steps 3-14 and 3-16).

FIG. 3 also shows an additional client terminal, denoted PC'. Steps 3-6 through 3-36 will be repeated for each additional client terminal. This means that by virtue of the inventive gateway application, which instructs the mobile station MS to act as a WLAN base station (as opposed to a WLAN client), the mobile station MS can support an arbitrary number of client terminals which act as WLAN client terminals and which, by virtue of the authentication performed by the mobile station, can share a single subscription to the access network.

FIG. 3 and the foregoing description of it illustrate use of HTTP protocol. The inventive gateway application supports other protocols in an analogous manner and assigns a specific port number to each supported protocol. For instance, the gateway application can instruct the mobile station to convey encrypted HTTPS traffic by utilizing the Proxy Configuration field of HTTPS protocol.

In addition to merely conveying internet traffic between the client terminal PC and the internet host, the inventive gateway application can, in some specific embodiments, provide additional or supplementary services which utilize some of the functionality of modern mobile stations. In some implementations, such supplementary services are provided by an arrangement in which a supplementary server enhances the service(s) provided by a primary server. Such a supplementary server can be part of the functionality of the inventive WLAN gateway application, or it can be implemented as a network element distinct from the primary server.

One exemplary implementation of such additional services involves utilization of GPS (Global Positioning System) devices incorporated into some mobile stations. The inventive gateway application may be enhanced to associate GPS-provided geographical coordinates to the PC-to-host traffic, or some of that traffic. For instance, the gateway application can tag still or video image data with geographical coordinates and/or use some additional service (not shown separately) that maps the geographical coordinates to a plaintext name of the relevant location. In another implementation the gateway application associates GPS-provided coordinates to the traffic, or some of it, while the actual tagging of the images with the coordinates is provided by some additional server, such as an image sharing server (not shown separately). Actually, what matters is the location of the client terminal and not the location of the mobile station acting as a WLAN gateway. But considering the short range of the mobile station's WLAN transmission, the mobile station's location can be used as the client terminal's location for virtually all practical purposes.

In a more ambitious implementation, the gateway application can provide additional services on the basis of the geographical coordinates. For instance, the gateway application can recognize various queries initiated by the client terminal and/or responses to those queries by internet servers and enhance the query responses by relevant map or photography information. For instance, the gateway application can detect a query to "post" and provide the query response with a map and/or photograph of the post office closest to the mobile station's GPS-provided geographical coordinates. In order to obtain the map and/or photograph, the gateway application may query a supplementary server which provides the requested functionality.

Another example of such additional services relates to traffic statistics which the gateway application collects and transmits to some internet-based supplementary server (not shown separately). For example, such a supplementary server may use the traffic statistics to monitor Quality of Service (QoS) parameters, which can be used to maintain the QoS at a specified level and/or to optimize resource usage in the access network. In some embodiments the supplementary server is an advertising server. The advertising server may utilize the traffic statistics for targeted or tailored advertising to the client terminal PC. Such traffic statistics may include, for example, user identification, usage (amount of traffic, usage times, internet addresses visited, query parameters, or the like). Alternatively or additionally, the gateway application may transmit traffic statistics to a billing server which participates in charging the client terminal's subscriber. Yet further, the advertising server and the billing server may cooperate in such a mariner that the advertising server's operator sells advertisement space or time and the advertising server credits the client terminal's subscriber for any advertisements received. The credits are then relayed to and used by the billing server in order to reduce the client terminal's subscriber's invoice, generate additional services, extend prepaid subscription time, to name just a few examples.

Finally, the gateway application may be configured to convey the mobile station's location, or some derivative it, to the advertising server for targeted or tailored advertising on the basis of the mobile station's location. For instance, targeted advertising for some goods or service may include sending an advertisement to a client terminal only if the mobile station's location indicates that the client terminal is reasonably close to the outlet of the goods or service. On the other hand, tailored advertising may be implemented such that the advertisement indicates the address or location of the closest outlet.

Figure 4:
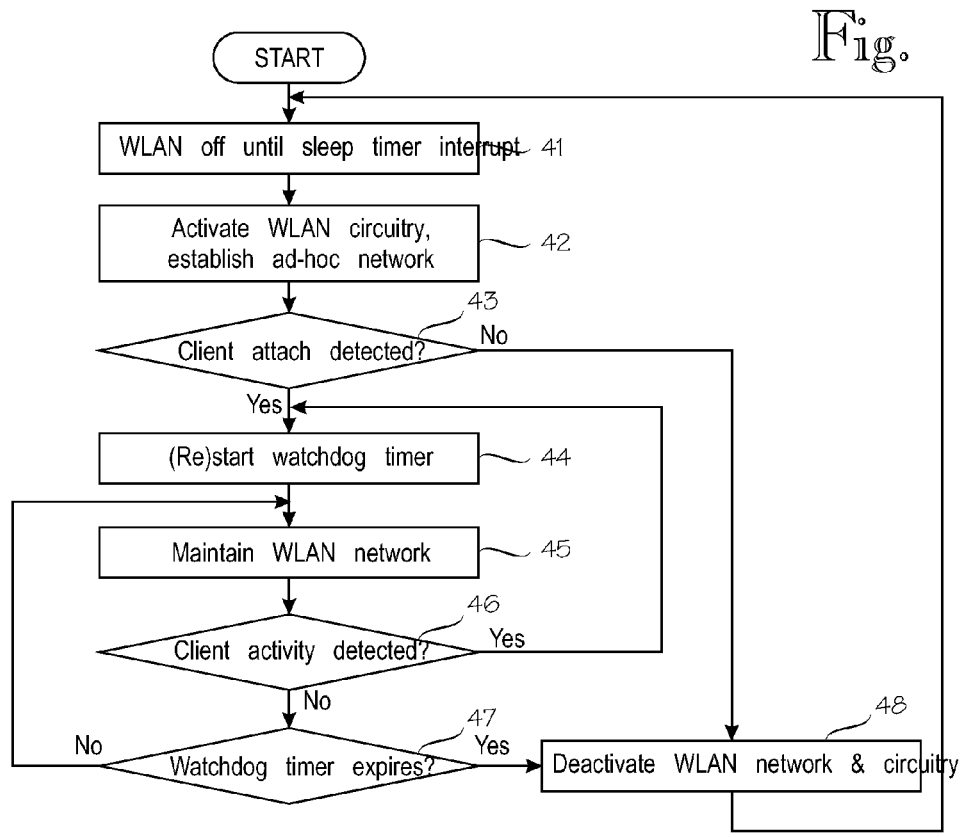
FIG. 4 shows an embodiment in which the gateway application in the mobile station is activated automatically in response to detection of a nearby WLAN client terminal.
Figure 5:
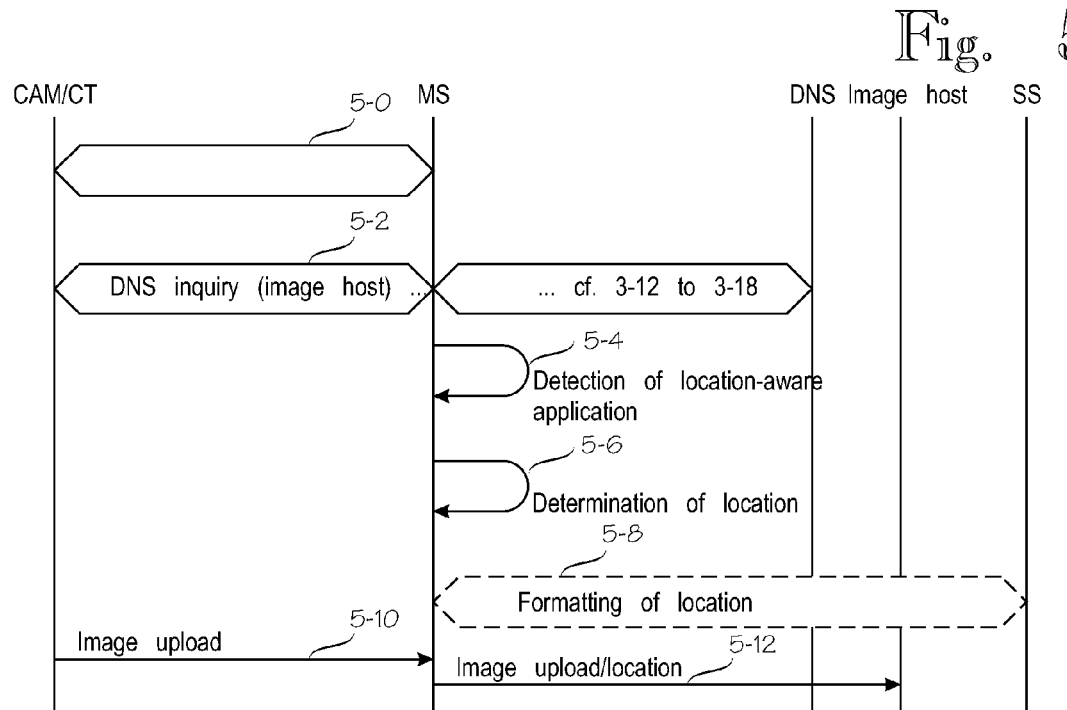
FIG. 5 shows an embodiment in which the mobile station's location-determination functionality is used to enhance image uploading to an image hosting server.

FIGS. 4 and 5 illustrate some exemplary embodiments in which the present invention benefits from the functionality of modem mobile stations, such that the resulting WLAN gateway is functionally superior to dedicated WLAN base stations. FIG. 4 shows an embodiment in which the WLAN circuitry, and optionally the WLAN gateway application, in the mobile station MS is activated periodically to detect possible WLAN client terminals CT nearby. In one representative scenario, a WLAN-capable digital camera acts as a WLAN client terminal. In the embodiment shown in FIG. 4, the mobile station MS employs two timers which may be realized by means of software-implemented tick counters, as is well known to those skilled in the art. One of the timers is called a sleep timer while the other is called a watchdog timer. The sleep timer's function is to periodically wake up the mobile station's WLAN circuitry, and optionally the WLAN gateway application. The watchdog timer is used to detect non-activity periods of predetermined length in the WLAN network so that the WLAN circuitry can be powered off in order to optimize battery resources.

In step 41 the WLAN circuitry of the mobile station MS is powered off and the execution of the WLAN gateway application may be suspended or terminated. Step 41 terminates when the sleep timer expires. For instance, the sleep timer may generate a processor interrupt which directs the mobile station's processor to perform program routines for activating the WLAN circuitry and starting or resuming execution of the WLAN gateway application. After step 42 the mobile station has established a WLAN network. In step 43 the mobile station checks if any client terminal(s), such as the exemplary digital camera, attempt(s) to attach to the WLAN network. If not, the process proceeds to step 48, in which the WLAN network and circuitry are deactivated and the process begins anew at step 41. On the other hand, if any client terminal attaches to the WLAN network, the mobile station starts a watchdog timer in step 44 and maintains the WLAN network as indicated in step 45. Step 46 includes a test to detect client terminal activity. If client terminal activity is detected, the process returns to step 44 in which the watchdog timer is restarted. Naturally, any client-related requests are served as well, as part of the basic functionality of the WLAN gateway application. On the other hand, if no client terminal activity is detected, the process proceeds to step 47 which is a test as to whether the watchdog timer has expired. If not, the process returns to step 45 in which the WLAN network is maintained without restarting the watchdog timer. Eventually, a moment occurs when no client activity has been detected and the watchdog timer expires, and this is detected in step 47. Then, in step 48, the WLAN network and circuitry are deactivated and the process begins anew at step 41.

By virtue of the embodiment described in connection with FIG. 4, the WLAN gateway application may terminate its own execution and power off the mobile station's WLAN circuitry. The automatic execution of the gateway application and the accompanying automatic activation of the mobile station's WLAN circuitry provides certain benefits. For instance, both digital cameras and mobile stations are handicapped by small user interfaces and relatively short battery life, particularly when their liquid-crystal displays (LCD) are illuminated. The automation described in connection with the present embodiment alleviates such handicaps.

FIG. 5 shows an embodiment in which the mobile station's location-determination functionality is used to enhance image uploading to an image hosting server. In step 5-0 a WLAN connection is established between the gateway application being executed in the mobile station MS and the WLAN-equipped digital camera CAM acting as a client terminal CT. For details of the WLAN connection establishment a reference is made to FIGS. 3 and 4. In step 5-2 the camera CAM/CT initiates a DNS inquiry to obtain the internet address of the image hosting server. In step 5-4 an embodiment of the gateway application being executed in the mobile station MS detects that the camera/client terminal CAM/CT executes a location-aware application. Accordingly, the gateway application uses the mobile station's location-determination functionality to determine the mobile station's location. For instance, the mobile station's location may be determined on the basis of the mobile station's built-in satellite-positioning device (GPS) or on the basis of cell ID determination in the access networks. In an optional step 5-8, the gateway application sends the mobile station's location to an embodiment of the supplementary server SS, which in this scenario receives the mobile station's location and returns a plaintext-formatted location description. For instance, the geographical coordinates or cell ID of Piccadilly Circus might be converted to a plaintext description of "Piccadilly Circus, London". In step 5-10, the camera/client terminal CAM/CT begins uploading of image data to the image hosting server. In step 5-12 the gateway application complements the image data with the mobile station's location. In one particular implementation, the location data is placed in a metadata field of the image(s).

Figure 6:
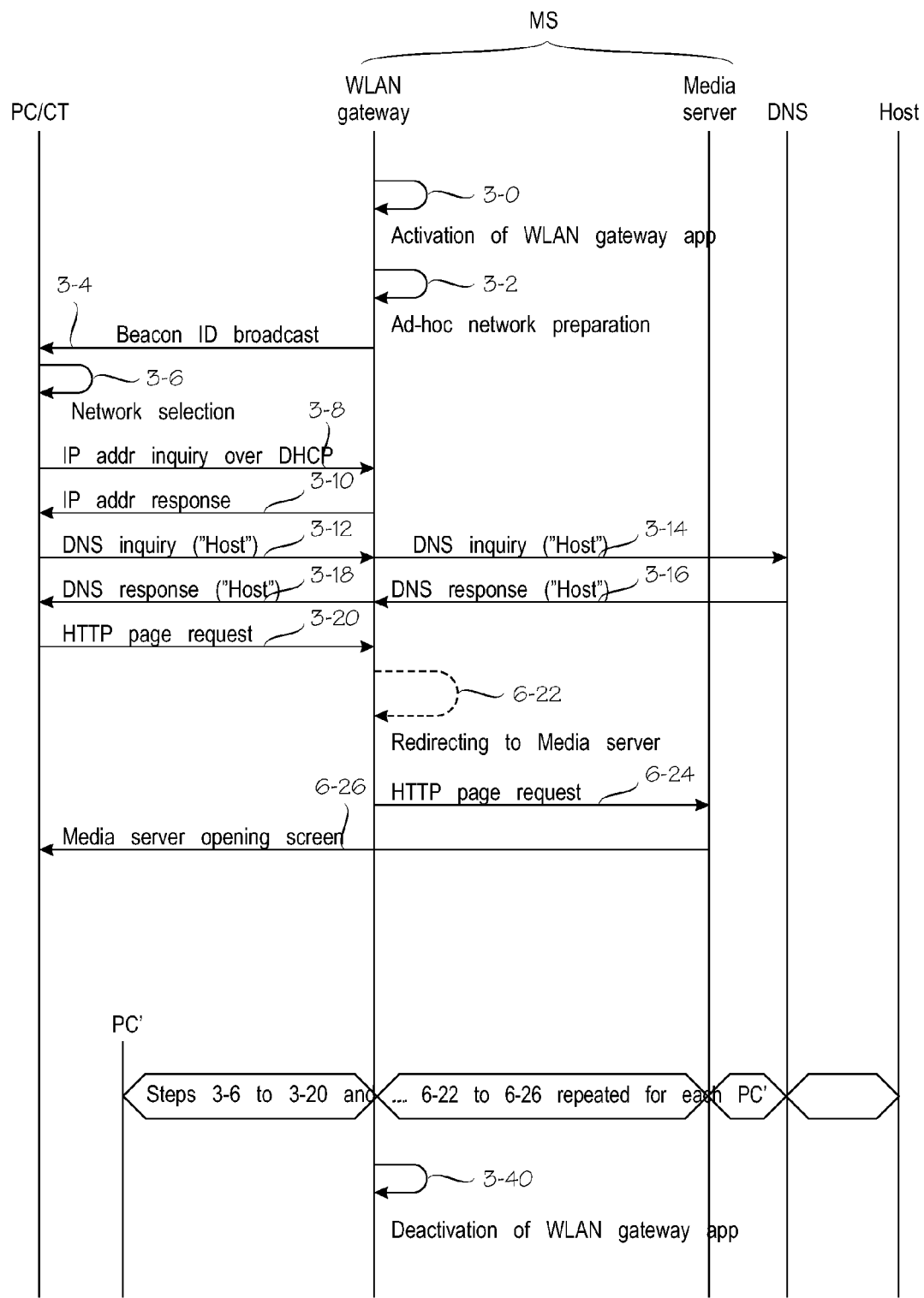
FIG. 6 shows applications for a forced homepage feature.

FIG. 6 shows applications for a forced homepage feature. Steps 3-22 through 3-28 described in connection with FIG. 3 related to a forced homepage feature, wherein, when a client terminal PC/CT requests a page from a server called Host, the gateway application forces the client terminal's first HTTP page request to a forced home page at the IP address of Host'. FIG. 6 shows a variation of this feature wherein the mobile station acting as the WLAN gateway also contains a media server for sharing media or content among the client terminals served by the mobile station's gateway application. An illustrative but non-exhaustive list of content types which may typically be used in connection with the media server includes image files, such as photographs, illustrations, or the like; moving images, such as video clips or computer-created animations, text documents, presentations, or any other types of content that people may share among friends, relatives or colleagues, or in business-to-business discussions. In connection with smart mobile phones, the list of useful content types further includes contacts (for name and contact information) and settings (for smart phones). The mobile station acting as the WLAN gateway stores the content for the media server locally.

In FIG. 6, steps 3-0 through 3-20 are similar or can be similar to the corresponding steps discussed in connection with FIG. 3, which is why these steps will not be described again. Step 6-22 is analogous with step 3-22, in which the gateway application initiated redirection of the client terminal's first HTTP page request to the forced home page. In the embodiment shown in FIG. 6, the forced home page points to the media server of the mobile station acting as the WLAN gateway. Step 6-24 is similar to step 3-24, in which the client terminal makes its first HTTP page request. In the present embodiment the page request is redirected to the media server's opening screen. In a typical but non-restrictive implementation, the media server's opening screen may present links to the various content types offered by the media server, such as "Photos", "Videos", "Documents", "Illustrations", "Contacts", "Settings", etc. In step 6-26 the media server's opening screen is returned to the client terminal PC/CT. Assuming that the media server's opening screen contains links to the various content types offered by the media server, the user of the client terminal may now activate any one of these links at a time for navigating to the section, such as a folder, of the media server that stores the relevant content types. The user of the client terminal may then opt to transfer content from the client terminal to the media server or vice versa. Uploading of content from the client terminal to the media server and downloading of content from the media server to the client terminal takes place over the WLAN network established by the WLAN gateway. This feature thus eliminates the need to transfer locally shared content over a mobile network and the global internet. The client terminals may use an internet browser to access the content stored on the media server. Alternatively or additionally, the capability to access the content stored on the media server may be implemented in the client terminals.

Figure 7:
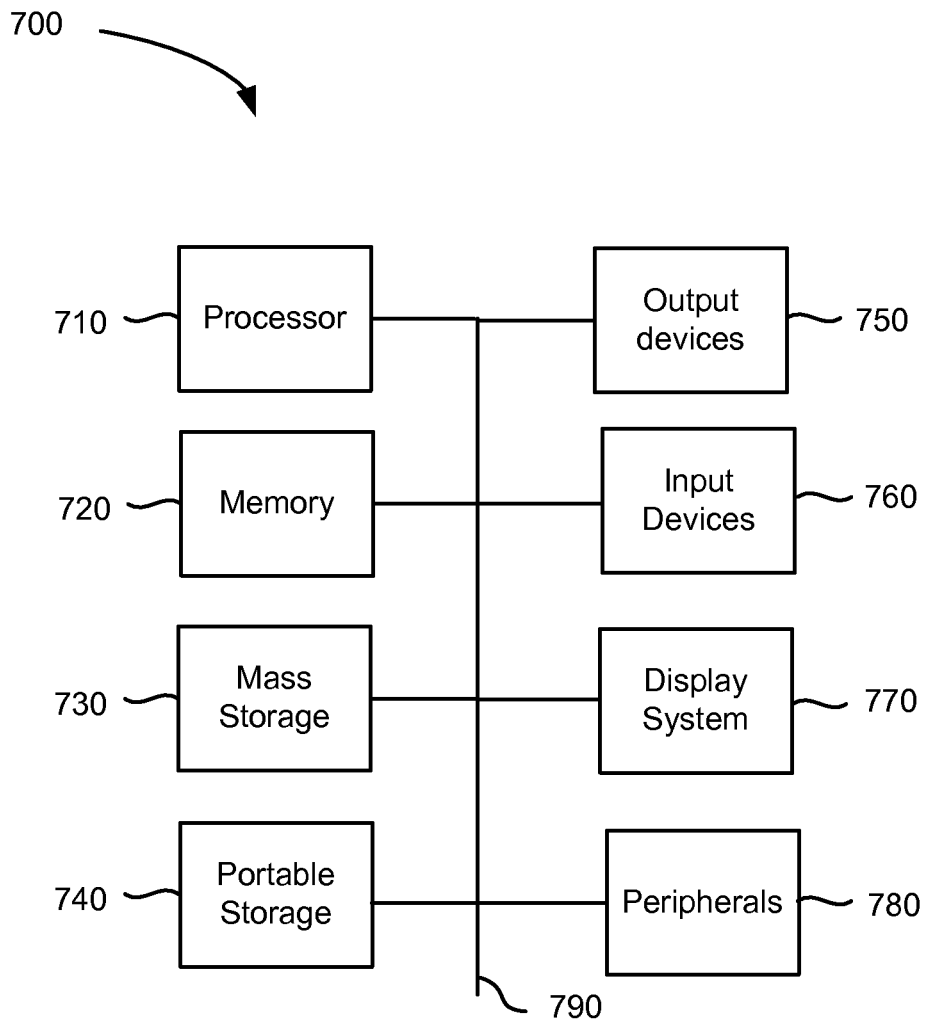
FIG. 7 is a block diagram of an exemplary system for implementing a computing device.

FIG. 7 illustrates an exemplary computing system 700 that may be used to implement a computing device for use with the present technology. System 700 of FIG. 7 may be implemented in the contexts of the likes of a mobile station MS, a PC/CT, or host 190. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multiprocessor platforms, etc. Various operating systems can be used including Unix, Linux, Windows, Macintosh OS, Palm OS, and other suitable operating systems.

According to another optional feature, the media server contains an access control facility by which the user of the mobile station may determine which folders are visible to the client terminals of the local WLAN network.

As regards implementation, the media server can be a light server configured to support a few client terminals simultaneously. Highly complex server functions can be considered superfluous in a typical implementation, with file server functionality and, optionally, access control being the most important function(s).

It is readily apparent to a person skilled in the art that, as the technology advances, the inventive concept can be implemented in various ways. The invention and its embodiments are not limited to the examples described above but may vary within the scope of the claims.

The invention claimed is:
1. A mobile station, comprising:
a memory;
a processor;
a radio transceiver operable to establish and maintain a broadband connection with a mobile communication network;
wireless local-area network (WLAN) circuitry having a first mode of usage acting as a WLAN client, and a second mode of usage acting as a WLAN base station capable of communicating with at least one WLAN terminal over a WLAN network;
a gateway application stored in the memory, wherein the gateway application, when executed by the processor, is configured to:
activate the second mode of the WLAN circuitry,
create a network identifier for the WLAN base station, assign an internet protocol address for the at least one WLAN terminal, resolve domain name service (DNS) queries in cooperation with an external DNS service system, assign at least one port number for each protocol supported by the gateway application, tunnel internet traffic between the at least one WLAN terminal and an internet host over the broadband connection, and deactivate the second mode of the WLAN circuitry in response to a detected absence of all WLAN terminals for a predetermined period of time.

2. The mobile station according to claim 1, further comprising means for downloading and executing the gateway application.

3. The mobile station according to claim 1, wherein the gateway application is further executed by the processor to redirect a first HTTP page request from each mobile station during an internet session to a predetermined internet address.

4. The mobile station according to claim 1, wherein the mobile station comprises means for determining a location of the mobile station and the gateway application further comprises a code portion for associating the determined location to the tunneled internet traffic.

5. The mobile station according to claim 4, wherein the gateway application is further executed by the processor to provide one or more additional services to the WLAN terminal based on the determined location.

6. The mobile station according to claim 1, wherein the gateway application is further executed by the processor to collect traffic statistics for the tunneled traffic and for transmitting at least a portion of the collected traffic statistics to a supplementary server.

7. The mobile station according to claim 1, wherein the gateway application is further executed by the processor periodically or in response to a detected activity of the at least one WLAN terminal.

8. A method for operating a mobile station, the method comprising:

activating a second mode of usage of wireless local-area network (WLAN) circuitry, wherein the WLAN circuitry has a first mode of usage acting as a WLAN client, wherein the second mode of usage corresponds to acting as a WLAN base station capable of communicating with at least one WLAN terminal over a WLAN network;

creating a network identifier for the WLAN base station;

assigning an internet protocol address for the at least one WLAN terminal;

resolving domain name service (DNS) queries in cooperation with an external DNS service system;

assigning at least one port number for each protocol supported by the gateway application;

tunneling internet traffic between the at least one WLAN terminal and an internet host over a broadband connection; and deactivating the second mode of the WLAN circuitry in response to a detected absence of all WLAN terminals for a predetermined period of time.

9. A non-transitory computer readable medium having embodied thereon a program, the program being executable by a processor to perform a method for operating a mobile station, the method comprising:

activating a second mode of usage of wireless local-area network (WLAN) circuitry, wherein the WLAN circuitry has a first mode of usage acting as a WLAN client, wherein the second mode of usage corresponds to acting as a WLAN base station capable of communicating with at least one WLAN terminal over a WLAN network;

creating a network identifier for the WLAN base station;

assigning an internet protocol address for the at least one WLAN terminal;

resolving domain name service (DNS) queries in cooperation with an external DNS service system;

assigning at least one port number for each protocol supported by the gateway application;

tunneling internet traffic between the at least one WLAN terminal and an internet host over a broadband connection; and deactivating the second mode of the WLAN circuitry in response to a detected absence of all WLAN terminals for a predetermined period of time.

10. The non-transitory computer readable medium according to claim 9, wherein the program is executable by the processor periodically or in response to a detected activity of the at least one WLAN terminal.

* * * * *